June 20, 1961
G. LA MOTTE
2,989,056
TOBACCO STRIPPER AND CLASSIFIER
Filed Oct. 5, 1960
3 Sheets-Sheet 1
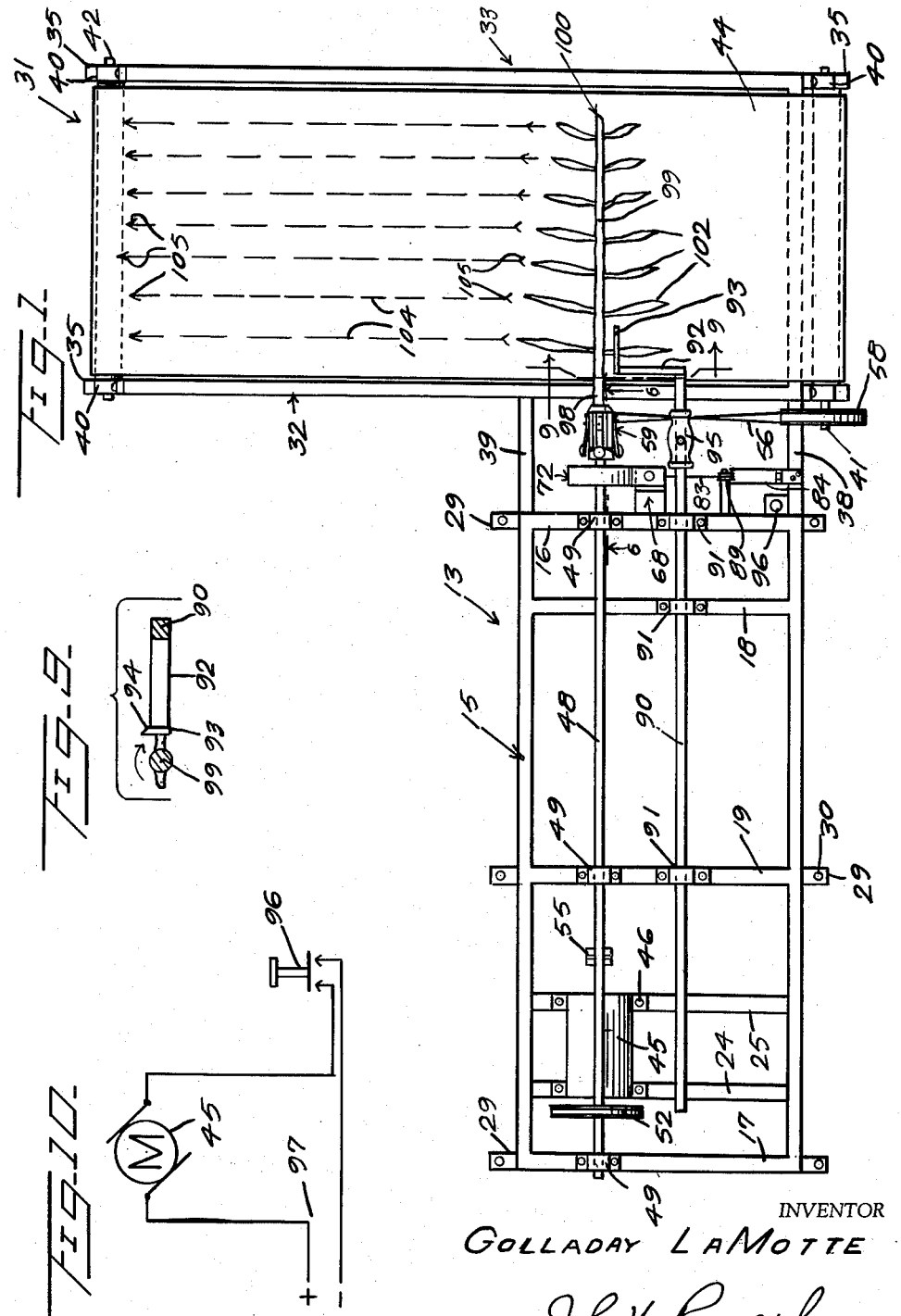
INVENTOR
GOLLADAY LAMOTTE
BY John K. Randolph
ATTORNEY

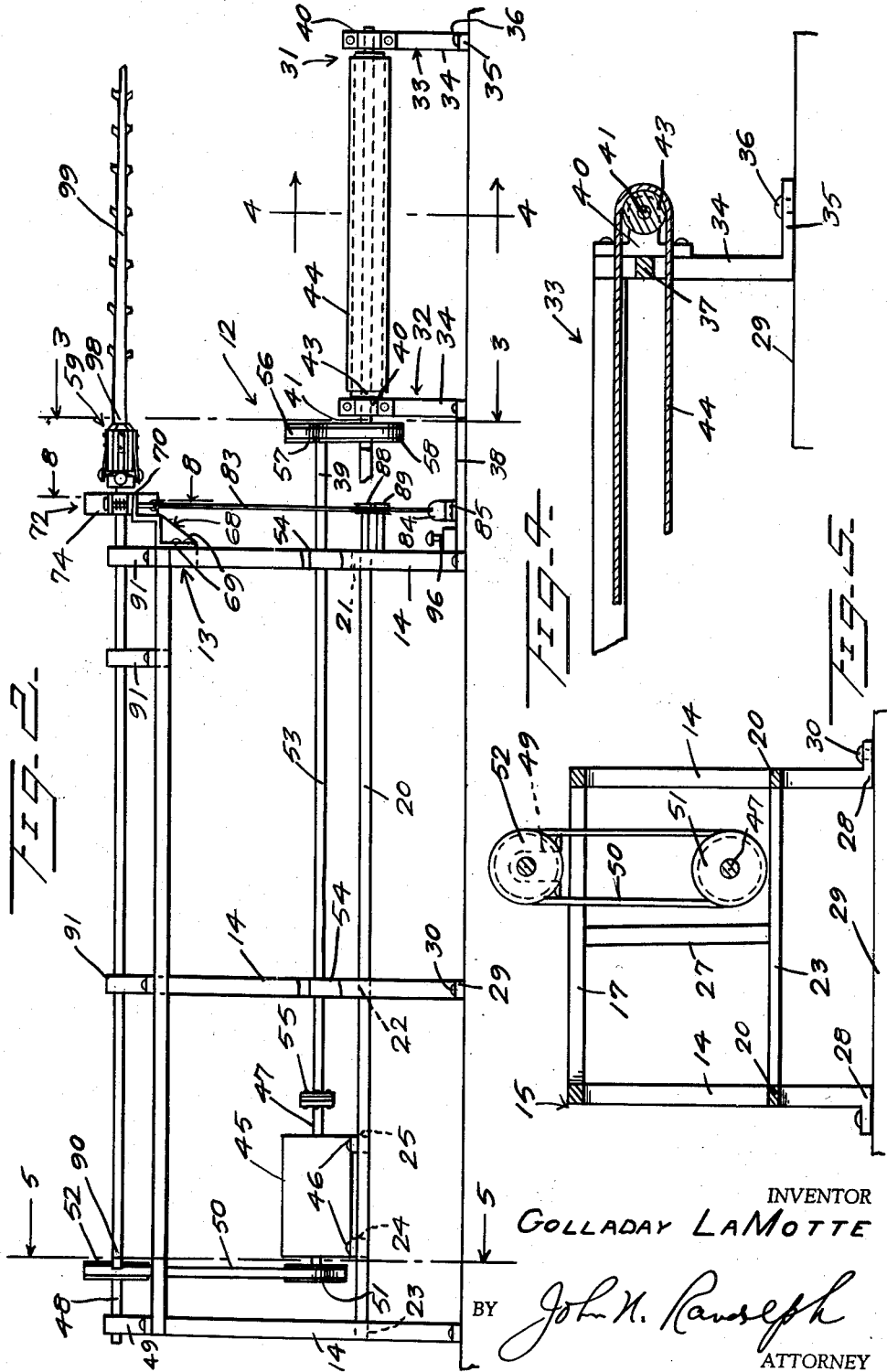

June 20, 1961 G. LA MOTTE 2,989,056
TOBACCO STRIPPER AND CLASSIFIER
Filed Oct. 5, 1960
3 Sheets-Sheet 3
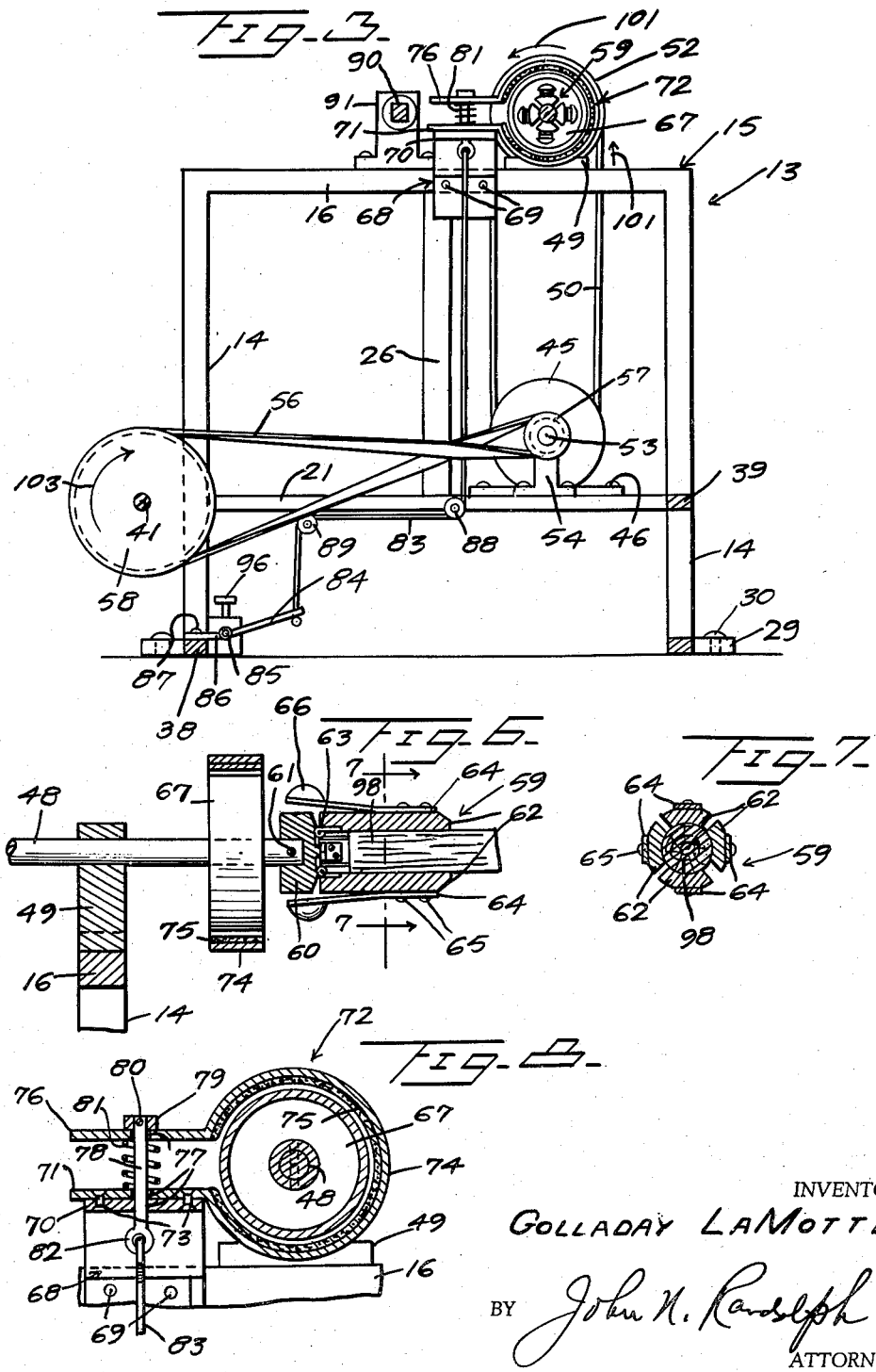
INVENTOR
GOLLADAY LaMOTTE
BY John N. Randolph
ATTORNEY

United States Patent Office 2,989,056
Patented June 20, 1961

1

2,989,056
TOBACCO STRIPPER AND CLASSIFIER
Golladay La Motte, R.F.D. 1, Clarksville Pike,
Hopkinsville, Ky.
Filed Oct. 5, 1960, Ser. No. 60,741
8 Claims. (Cl. 131—131)

This invention relates to a machine of extremely simple construction for rapidly stripping the leaves from tobacco stalks.

A tobacco stalk usually has leaves of five different classes or grades commencing with those nearest the base of the stalk and ending with those nearest the tip of the stalk.

Another object of the present invention is to provide a machine wherein the leaves will be separated or classified automatically as they are severed from the stalk.

Still a further object of the invention is to provide a machine capable of supporting and rapidly rotating a tobacco plant to cause the leaves to assume extended positions relative to the stalk by centrifugal force, and so that the leaves can be effectively severed rapidly from the revolving stalk.

Still a further object of the invention is to provide a machine which is so constructed that the butt end of the stalk of a tobacco plant may be quickly applied to the rotatably driven part of the machine and the stalk thereafter quickly removed from said part after severence of the leaves therefrom, so that removal of the leaves from the stalk can be rapidly effected.

Still another object of the invention is to provide a machine of the aforedescribed character of extremely simple construction which may be economically manufactured and sold, which is extremely efficient and durable, and which may be expeditiously utilized.

Various other objects and advantages of the invention will hereinafter become more fully apparent from the following description of the drawings, illustrating a presently preferred embodiment thereof, and wherein:

FIGURE 1 is a top plan view of the machine;

FIGURE 2 is an enlarged side elevational view thereof, partly broken away, and looking toward the machine from the lower end of FIGURE 1;

FIGURE 3 is an enlarged cross sectional view, taken substantially along a plane as indicated by the line 3—3 of FIGURE 2;

FIGURE 4 is an enlarged fragmentary sectional view, taken substantially along a plane as indicated by the line 4—4 of FIGURE 2;

FIGURE 5 is a cross sectional view, taken substantially along a plane as indicated by the line 5—5 of FIGURE 2;

FIGURE 6 is an enlarged fragmentary sectional view, taken substantially along the line 6—6 of FIGURE 1;

FIGURE 7 is a cross sectional view through a part of the machine, taken substantially along a plane as indicated by the line 7—7 of FIGURE 6;

FIGURE 8 is an enlarged fragmentary vertical sectional view, taken substantially along a plane as indicated by the line 8—8 of FIGURE 2;

FIGURE 9 is an enlarged fragmentary cross sectional view, taken substantially along a plane as indicated by the line 9—9 of FIGURE 1, and FIGURE 10 is a diagrammatic view illustrating the electric circuit of the machine.

Referring more specifically to the drawings, the tobacco stripper and classifier in its entirety is designated generally 12 and includes an elongated frame, designated generally 13, having a plurality, preferably three, upright supporting legs 14 on each side thereof and which support at their upper ends a rectangular top frame 15 including end cross members 16 and 17 and intermediate cross members 18 and 19. The frame 13 additionally includes lower longitudinally extending braces 20, each of which is secured to the longitudinally aligned legs 14, and between which extend cross braces 21, 22, 23, 24 and 25. The front lower cross brace 21 is connected to the upper front cross brace 16 by an intermediate brace 26 which extends between and is secured to the intermediate portions of the cross braces 16 and 21, as seen in FIGURE 3. A similar upright brace 27 connects the rear cross braces 17 and 23, as seen in FIGURE 4. The frame uprights 14 have outturned foot members 28 at their lower ends which are adapted to rest on a floor or other supporting surface 29 and which are secured thereto by fastenings 30.

An endless conveyor frame, designated generally 31, comprises longitudinally extending side members 32 and 33 which are disposed substantially parallel to one another and which have supporting uprights 34 at the ends thereof. The lower ends of the uprights 34 are provided with outturned foot members 35 which are secured to the supporting surface 29 by fastenings 36. The transversely aligned uprights of the frame sides 32 and 33 are connected by cross braces 37, as seen in FIGURE 4. The frame 31 is disposed crosswise of the frame 13 and has one end thereof disposed in front of and spaced from the forward end of the frame 13. The frame side 32 of said frame end is disposed nearest the forward end of the frame 13 and one of the upright legs 34 thereof is disposed in alignment with and connected to a front leg 14 by a bottom brace 38 which rests on the surface 29. The other front leg 14 is connected to the frame side 32 by a brace 39, as seen in FIGURES 1 and 3. Accordingly, the frames 13 and 31 are disposed immovably relative to one another.

Bearings 40 are secured to and project outwardly from the uprights 34, so that the bearings 40 at each end of the frame 31 are disposed beyond said frame end and in transverse alignment with one another, as seen in FIGURE 1, to provide journals for the ends of shafts 41 and 42. Rollers 43 are fixed to the shafts 41 and 42, between the bearings 40 thereof, and an endless conveyor belt 44 is trained over said rollers 43 and is disposed to travel within the frame 31, between the frame sides 32 and 33.

An electric motor 45 is mounted on the cross braces 24 and 25 and is secured thereto by fastenings 46. The armature shaft 47 of the motor 45 is disposed longitudinally of the frame 13. A shaft 48 is disposed above the frame 13 and is journaled in bearings 49 which are fixed to and rise from the upper cross braces 16, 17 and 19. An endless belt 50 is trained over a belt pulley 51, fixed to the rear end of the armature shaft 47, and a belt pulley 52, which is fixed to the shaft 48, and which is disposed in the same vertical plane as the belt pulley 51, for driving the shaft 48 from the motor shaft 47.

A shaft 53 is journaled in bearings 54 which are fixed to and rise from the lower cross braces 21 and 22. The shaft 53 is disposed in alignment with the motor shaft 47, and the rear end of the shaft 53 is connected by a coupling 55 to the forward end of the motor shaft 47. The forward end of the shaft 53 extends to beyond the forward end of the frame 13 and is connected to the end of the shaft 41, which is located nearest the frame 13, by an endless belt 56 which is trained over a small pulley 57, fixed to the shaft 53, and a large pulley 58, fixed to the shaft 41. The belt 56 is crossed between the pulleys 57 and 58 so that the pulley 58 and shaft 41 turn in the opposite direction to the pulley 57 and shaft 53.

A chuck, designated generally 59, includes a head 60 which is secured immovably by a fastening 61 to the forward end of the shaft 48, forwardly of and spaced from the forward end of the frame 13. The chuck 59 includes a plurality, preferably four, jaws 62 which project forwardly from the head 60. Each of the jaws 62 is connected at its inner end to the head 60 by a hinge 63, for swinging movement of said jaws 62 toward and away from one another. A leaf spring 64 is secured by fastenings 65 to the outer side of the forward end of each jaw 62. The leaf springs 64 extend inwardly of the jaws 62 and have weights 66 secured to their inner ends and which are disposed inwardly with respect to the axes of the hinges 63.

A brake drum 67 is fixed to the shaft 48, between the chuck 59 and the forwardmost bearing 49. A bracket 68 is secured by fastenings 69 to the forward side of the upper front cross brace 16, and to one side of the brake drum 67. The bracket 68 has a forwardly offset, forwardly extending horizontal top portion 70. One end 71 of a spring metal brake band 72 is secured by fastenings 73 to the bracket portion 70 and crosswise thereof. The brake band 72 has an intermediate portion 74 in the shape of a split ring which is normally disposed around and spaced outwardly from the periphery of the drum 67, and the inner surface of which is covered with brake lining material 75. The other free end 76 of the brake band 72 is disposed above and spaced from the end 71 thereof. The bracket portion 70 and brake band ends 71 and 76 have aligned openings 77 through which a rod 78 slidably extends. A collar 79 is secured as by a pin 80 to the upper end of rod 78 and bears against the upper side of the brake band end 76. A coiled spring 81 is mounted loosely on the rod 78 between the brake band ends 71 and 76, for urging the brake band end 76 upwardly, away from the brake band end 71, to maintain the brake band portion 74, including the brake lining 75, normally out of contact with the drum 67.

The lower end of the rod 78 is provided with an eye 82, which is disposed beneath and spaced from the bracket portion 70 and to which one end of a cable or other flexible element 83 is secured. The other lower end of the cable or flexible element 83 is secured to the inner free end of a foot pedal 84. Pedal 84 is connected at its other end by a hinge 85, as seen in FIGURE 3, to a bracket 86 which is secured by a fastening 87 to the upper side of the brace 38, so that said pedal extends inwardly from the bracket. The cable extends downwardly from the eye 82 under a pulley 88, and then laterally of the frame 13 and over a pulley 89, from which latter pulley the cable extends downwardly to the pedal 84. The pulleys 88 and 89 are supported by the lower front cross brace 21.

Looking from front to rear of the frame 13, as seen in FIGURE 3, the shaft 48 is disposed near the right side of the frame and a rod 90 is disposed to the left of said shaft and of the bracket 68. The rod 90 is of non-circular cross section and slidably engages guides 91 which are secured to and extend upwardly from the cross braces 16, 18 and 19. The rod 90 is provided at its forward end with a laterally extending arm 92 which is disposed over the endless conveyor 33 and which extends toward an extension of the axis of the shaft 48. A knife 93 is fixed to and extends forwardly from the arm 92 and is offset from and disposed substantially parallel to the axis of the rod 90. As seen in FIGURE 9, the knife 93 has a sharpened upper edge 94. A handgrip 95 is secured to the rod 90 between the arm 92 and the forwardmost guide 91.

A pushbutton switch 96 is interposed in the electric circuit 97 of the motor 45, as illustrated diagrammatically in FIGURE 10. The electric circuit 97 can be connected to any conventional source of electric current such as a domestic electrical outlet. The pushbutton switch 96 is secured to the brace 38 to one side of and adjacent the brake pedal 84, as seen in FIGURES 1 and 3.

To operate the machine 12 for stripping tobacco, the butt end 98 of the stalk 99 of a tobacco plant 100 is inserted into the chuck 59. This can be readily accomplished since usually two of the chuck jaws 62, which are disposed below the horizontal plane of the chuck, will be swung downwardly by their weights 66, when the chuck 59 is not rotating, so that the chuck jaws will be sufficiently opened to enable the stalk butt 98 to be inserted therein. The operator, not shown, standing to the left of the pulley 58, as seen in FIGURE 1, then applies pressure with either foot to the switch 96 for closing the electric circuit to the motor 45 to revolve the shafts 47 and 48 to cause the chuck and tobacco plant 100 to revolve in a counterclockwise direction, as viewed from front to rear of the machine, as indicated by the arrows 101 in FIGURE 3. As the chuck 59 commences to rotate the weights 66 will be displaced outwardly by a centrifugal force to quickly close the jaws 62 for clamping the stalk butt 98 in said chuck. The leaves 102 of the plant 100 will be caused to assume extended substantial radial positions relative to the stalk 99 by a centrifugal force as the plant is revolved. The knife 93 is disposed adjacent the stalk 99 and between said stalk and the rod 90. While the tobacco plant 100 is revolving, the operator will grasp the handle 95 to move the rod 90 and knife 93 forwardly or from left to right of FIGURE 1. As the knife 93 travels toward the outer end or tip of the stalk 99, the tobacco leaves 102 will be revolved downwardly across the cutting edge 94 for severing each leaf 102 near the stalk. The leaves 102 after being severed will drop onto the upper flight of the endless conveyor belt 44 which is moving in the opposite direction to the shaft 48 as indicated by the arrow 103 in FIGURE 3, which is applied to the pulley 58. The severed leaves 102 will fall in rows onto the upper flight of the belt 44, as indicated by broken lines 104 in FIGURE 1, and will thus be separated or classified. The leaves will be conveyed in the direction as indicated by the arrow tips 105 of the lines 104 and discharged as thus classified from the end of the conveyor 31 located remote from the frame 13, substantially separated according to the different grades of leaves between the base end and tip of the stalk 99. The knife 93 can be rapidly moved from the butt end 98 of the tip of the stalk 99 for severing all of the revolving leaves 102. As soon as this is accomplished, the operator releases his foot pressure on the switch 96 to deenergize the motor 45 and applies the foot to the brake pedal 84. Such pressure displaces the pedal 84 downwardly to exert a downward pull on the cable 83 and rod 78 for pulling the brake band end 76 downwardly to contract the brake band portion 74 to draw the lining 75 into contact with the periphery of the drum 67 to quickly stop rotation of the shaft 48 and chuck 59. While this is being accomplished, the rod 90 is manually moved from right to left of FIGURE 1 to position the knife 93 adjacent the chuck 59.

As the chuck 59 ceases to rotate one or two of the jaws 62 will swing open so that the stalk 99 can be extracted from the chuck and the butt end 98 of the stalk of another plant 100 can then be quickly applied to the chuck 59, so that the previously described operation can be repeated without delay. When pressure on the pedal 84 is released, the spring 81 will return the brake band 72 to a released position. This is accomplished when the foot is removed from pedal 84 and applied to the switch 96. It will thus be seen that leaves 102 can be quickly severed and sorted by one operator utilizing the machine 12 and in a much more efficient and accurate manner than where this operation is accomplished by hand.

Various modifications and changes are contemplated and may be resorted to, without departing from the function or scope of the invention as hereinafter defined by the appended claims.

I claim as my invention:

1. A machine of the character described, comprising a frame having a forward end, bearings supported by said frame, a shaft journaled in said bearings, an electric motor connected to and driving said shaft and supported by said frame, means secured to an end of the shaft and disposed beyond said forward frame end and adapted to receive and detachably clamp the butt end of a tobacco plant stalk for revolving the tobacco plant in unison with said shaft, a rod, guide means mounted on the frame in which said rod is slidably and nonturnably supported to one side of and substantially parallel to said shaft, a knife supported by said rod beyond the forward end of the frame, said knife being disposed parallel to said shaft for movement along and substantially parallel to the revolving stalk of the tobacco plant, when the rod is manually actuated, for severing leaves from the stalk as the leaves revolve across the knife.

2. A machine as in claim 1, and a driven endless conveyor having one end disposed beneath the tobacco plant for receiving the severed leaves and for conveying the leaves toward the other end of the endless conveyor and away from said frame.

3. A machine as in claim 2, said endless conveyor being disposed crosswise of the frame and tobacco plant whereby the severed leaves will fall in rows on said endless conveyor for classification.

4. A machine as in claim 3, means forming a driving connection between said endless conveyor and motor for driving the endless conveyor at a greatly reduced speed relative to the speed of rotation of said shaft.

5. A machine as in claim 4, an electric switch for stopping and starting said motor, and a manually actuated brake for stopping rotation of the shaft when the motor is de-energized whereby the stalk from which the leaves have been severed may be quickly removed from said clamp means and replaced by the stalk of a tobacco plant to be stripped.

6. A machine as in claim 1, said means comprising a chuck having pivoted jaws between which the tobacco stalk is releasably received, and centrifugal means connected to said jaws for urging the jaws toward closed positions for clamping the stalk therein when said chuck is revolved with the shaft.

7. A machine of the character described comprising a frame, bearings supported by said frame, a shaft journaled in said bearings, an electric motor connected to said shaft, a chuck secured to an end of said shaft and adapted to receive therein the butt end of a tobacco plant stalk, centrifugal means forming a part of said chuck for closing the chuck to clamp the stalk therein when the chuck is revolved with said shaft, a knife, and means supported by said frame and supporting said knife for movement longitudinally of the shaft along and in close proximity to the revolving stalk for severing the leaves therefrom as the knife is moved from end-to-end of the plant.

8. A machine as in claim 7, an electric switch for controlling the operation of said motor, and a manually actuated brake for stopping rotation of the shaft and chuck when the motor is de-energized by the switch to enable tobacco plant stalks to be readily applied to and removed from said chuck.

References Cited in the file of this patent
UNITED STATES PATENTS

| | | |
|---|---|---|
| 149,107 | Dykeman | Mar. 31, 1874 |
| 198,327 | Winn | Dec. 18, 1877 |
| 442,471 | Ames | Dec. 9, 1890 |
| 1,723,606 | Dolan | Aug. 6, 1929 |
| 2,574,030 | Green | Nov. 6, 1951 |